United States Patent [19]

Mottate

[11] Patent Number: 4,973,291
[45] Date of Patent: Nov. 27, 1990

[54] THIN FINITE LINEAR MOTION ROLLING GUIDE UNIT WITH APPARATUS FOR PREVENTING POSITIONAL DEVIATION OF HOLDER

[75] Inventor: Tatsuo Mottate, Tokyo, Japan

[73] Assignee: Nippon Thompson Co. Ltd., Tokyo, Japan

[21] Appl. No.: 441,695

[22] Filed: Nov. 27, 1989

[30] Foreign Application Priority Data

Jun. 19, 1989 [JP] Japan ................... 1-154421

[51] Int. Cl.$^5$ ............................................. F16H 27/02
[52] U.S. Cl. ..................... 474/140; 74/89.2; 384/49
[58] Field of Search ...................... 74/89.2, 110; 384/7, 384/17, 24, 49, 50, 57; 474/101, 140; 248/429, 430

[56] References Cited

U.S. PATENT DOCUMENTS

| | | | |
|---|---|---|---|
| 2,967,741 | 1/1961 | Bostelmann | 384/49 |
| 3,003,357 | 10/1961 | Votta | 74/89.2 |
| 3,488,098 | 1/1970 | Sobczak | 74/89.2 |
| 3,730,007 | 5/1973 | Wellington | 74/89.2 |
| 3,771,375 | 11/1973 | Mermelstein | 74/89.2 |
| 4,018,488 | 4/1977 | Manson | 248/429 |
| 4,616,885 | 10/1986 | Komiya | 384/49 |
| 4,753,540 | 6/1988 | Mottate | 384/7 |

Primary Examiner—Thuy M. Bui
Attorney, Agent, or Firm—Rogers & Killeen

[57] ABSTRACT

There is provided a thin finite linear motion rolling guide unit having an apparatus for preventing a positional deviation of a holder. The guide unit comprises a U-shaped bed member, an inverse U-shaped table member, and a M-shaped holder sandwiched between the bed member and the table member. Holding holes are formed horizontally in a line at regular intervals in a pair of outside opposite walls so as to rotatably hold the balls between the opposite track grooves formed on the bed member and the table member. Circular holes are formed in the central portions in the lognitudinal direction of the inside opposite walls of the holder. A pin is pressure inserted and fixed into the holes. A single type inside belt and a double-single type outside belt are wrapped to the central portion of the pin by a half rotation in the opposite directions so that the outside belt comes into contact with outer edges of the inside belt. Both belts are extended horizontally in the opposite directions along the upper and lower surfaces of flat plate-shaped coupling portions. Upper and lower sides of both belts are coupled and fixed to coupling portions on the tables and bed sides, repectively. Thus, the motion of the holder can be restricted to ½ of the rolling guide unit. In place of the belts, wire ropes can be also wrapped around a pulley with double V-shaped guide grooves attached to a rotary shaft.

3 Claims, 5 Drawing Sheets

THIN FINITE LINEAR MOTION ROLLING GUIDE UNIT WITH APPARATUS FOR PREVENTING POSITIONAL DEVIATION OF HOLDER

BACKGROUND OF THE INVENTION

1. Field of the Invention

The present invention relates to a thin finite linear motion rolling guide unit and, more particularly, to a unit which can be miniaturized as a whole and can maintain a high linear motion rolling accuracy for a long time by assembling a belt or a similar mechanism for preventing a positional deviation of a holder of the rolling guide unit.

2. Description of the Prior Art

A conventional technique of an apparatus for preventing a positional deviation of a holder using a belt has been disclosed in, for instance, Japanese Patent Application No. 56-113824.

According to such a technique, a holder is extended outwardly in the sliding direction of a track member, pulleys are provided in the extension edge portion, and a belt whose both ends are fixed is come into contact with upper and lower track members, thereby restricting the motion of the holder to ½ of that of a rolling guide unit and also accomplishing the dust proofing of the rolling guide unit.

However, since the pulleys are formed on the outside of the track member, there is a problem such that the whole rolling guide unit becomes longer. In addition, the whole holder becomes long and the weight of the pulleys is loaded to both ends of the holder, so that there occur problems such that the holder is easily deformed and a partial abnormal abrasion is caused and the slide resistance increases. There is a drawback such that the life of the rolling guide unit becomes short due to the deviation preventing apparatus.

Further, since two pulleys are formed at front and back positions, there is a drawback such that the number of parts increases and the costs are high.

As mentioned above, in the well-known construction, many problems are not solved yet. According to the invention, in order to solve such conventional drawbacks, one pulley or one pin to turn the direction of a belt or a rope is attached in the central portion of the sliding direction of a holder and the belt or rope is wrapped around the pulley or pin from both ends, thereby restricting a movement amount of the holder to ½ of a movement amount of a table.

Since the structure of the invention is simpler than that of the conventional technique, the construction of the invention is optimum to an apparatus for preventing a positional deviation of a holder of a relatively small thin linear motion rolling guide unit.

SUMMARY OF THE INVENTION

It is an object of the invention to provide a thin linear motion rolling guide unit with an apparatus for preventing a positional deviation of a holder in which a linear motion rolling guide can be realized at a high accuracy, while keeping the advantages of the thin linear motion rolling guide unit.

According to the invention, the above problems are solved by providing a thin linear motion rolling guide unit with an apparatus for preventing a positional deviation of a holder, comprising:

a long bed member (1) having a U-shaped cross section in which outside horizontal track grooves (12) for rolling are formed on outer surfaces of both of opposite side walls;

a long table member (3) having an inverse U-shaped cross section in which inside horizontal track grooves (32) for rolling are formed on inner surfaces of both of opposite side walls at positions which face the horizontal track grooves (12) on the bed member side and opposite side walls (11) of the bed member (1) are enclosed in a cavity portion (30) having a U-shaped cross section, the table member (3) being mounted over the bed member (1) so as to be slidable in its longitudinal direction; and a holder (2) having an almost M-shaped cross section which is interposed between the bed member (1) and the table member (3) and is constructed in a manner such that a number of holding holes (25) are formed horizontally in a line at regular intervals in a pair of outside opposite walls (21) so as to rotatably hold a number of rolling elements between the outside horizontal track groove (12) on the bed member side and the inside horizontal track groove (32) on the table member side, circular holes (4) are formed in almost central portions in its longitudinal direction of a pair of inside opposite walls (22) of the holder (2), a pin (6) is inserted and fixed with a pressure into the holes (4) in the direction perpendicular to the longitudinal direction, flat plate-shaped coupling portions (23) are formed symmetrically in both end portions in the longitudinal direction of the opposite inside walls (22), respectively, a single type inside belt (7) is wrapped to a central portion of the pin (6) by an almost half rotation, a double-single type outside belt (8) is wrapped to the pin (6) by an almost half rotation in the direction opposite to the inside belt (7) so as to come into contact with both of outer edges of the inside belt (7), the inside belt (7) and the outside belt (8) are extended horizontally in the opposite directions along both of upper and lower surfaces of the flat plate-shaped coupling portions (23), respectively, upper sides of both free ends of each of the inside belt (7) and the outside belt (8) are coupled to belt coupling portions (33) on the table member side provided in both end portions of the table member (3), and lower sides of the both free ends are coupled and fixed to belt coupling portions (13) on the bed member side provided in both end portions of the bed member (1).

According to another aspect of the invention, the above object is accomplished by a thin finite linear motion rolling guide unit having an apparatus for preventing a positional deviation of a holder, comprising:

a long bed member (1) having a U-shaped cross section in which outside horizontal track grooves (12) for rolling are formed on outer surfaces of both of opposite side walls;

a long table member (3) having an inverse U-shaped cross section in which inside horizontal track grooves (32) for rolling are formed on inner surfaces of both of opposite side walls at positions which face the horizontal track grooves (12) on the bed member side and opposite side walls (11) of the bed member (1) are enclosed in a cavity portion (30) having a U-shaped cross section, the table member (3) being mounted over the bed member (1) so as to be slidable in its longitudinal direction; and a holder (2) having an almost M-shaped cross section which is interposed between the bed member (1) and the table member (3) and is constructed in a manner such that a number of holding holes (25) are formed horizontally in a line at regular intervals in a pair of outside opposite walls (21) so as to rotatably hold a number of rolling elements between the outside horizontal track groove (12) on the bed member side and the inside horizontal track groove (32) on the table member side, circular holes (4) are formed in almost central portions in its longitudinal direction of a pair of inside opposite walls (22) of the holder (2), a rotary shaft (42) of a pulley (41) with a double V-shaped guide grooves is inserted and fixed into the circular holes (4) with a pressure, flat plate-shaped coupling portions (23) are formed symmetrically in both end portions in the longitudinal direction of the opposite inside walls (22), respectively, a first wire rope (39) is wrapped to one of the V-shaped grooves of the pulley (41) by an almost half rotation, a second wire rope (40) is wrapped to the other V-shaped groove adjacent to the V-shaped groove of the pulley (41) by an almost half rotation in the direction opposite to the first wire rope (39), the first wire rope (39) and the second wire rope (40) are extended horizontally in the opposite directions along both upper and lower surfaces of the flat plate-shaped coupling portions (23), respectively, upper sides of both free ends of each of the first wire rope (39) and the second wire rope (40) are coupled to wire rope coupling portions (33) on the table member side provided in both end portions of the table member (3), and lower sides of the both free ends are coupled and fixed to belt coupling portions (13) provided in both end portions of the bed member (1).

The above and other objects and features of the present invention will become apparent from the following detailed description and the appended claims with reference to the accompanying drawings.

DETAILED DESCRIPTION OF THE PREFERRED EMBODIMENTS

Figure 1:
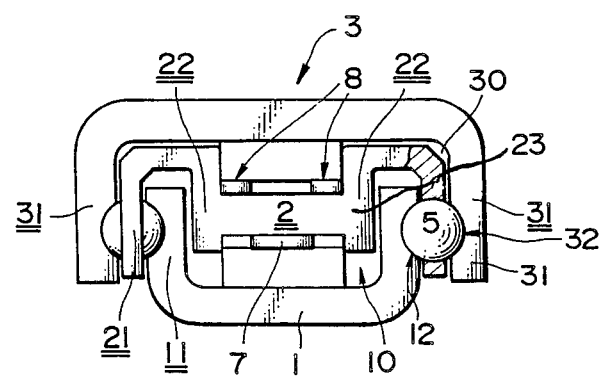
FIG. 1 is a front view showing the first embodiment of the present invention.
Figure 2:
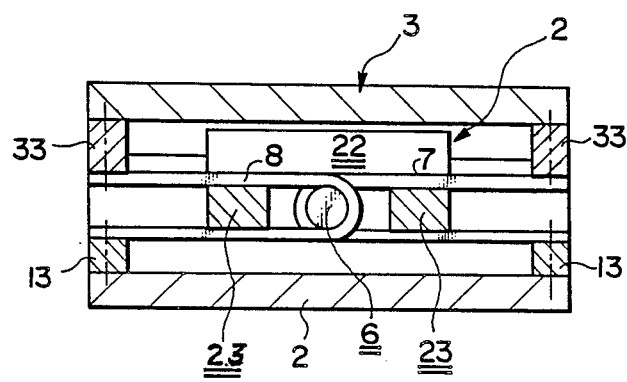
FIG. 2 is a side elevational view of FIG. 1.

FIG. 1 is a front view of the first embodiment of the invention. FIG. 2 is a side elevational view of the first embodiment.

As shown in the diagrams, reference numeral 1 denotes a long bed member having a U-shaped cross section and extending in the longitudinal direction. Horizontal track grooves 12 to roll balls are provided at opposite proper height positions on the outer surfaces of both opposite walls 11 forming a cup-shaped inner space portion 10 which extends in the longitudinal direction.

Figure 3:
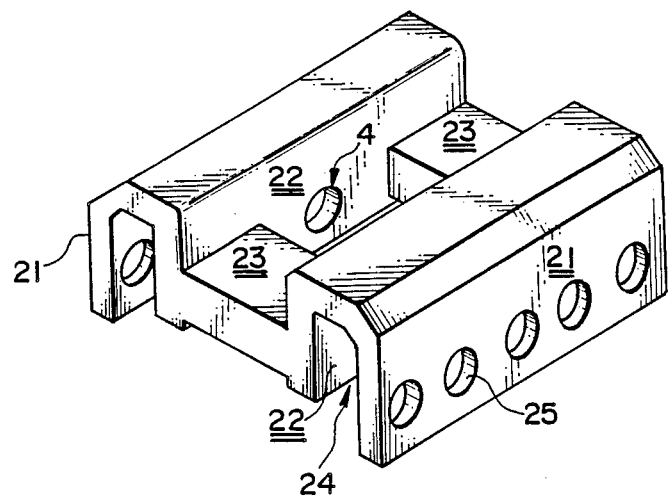
FIG. 3 is a perspective view of a holder of the first embodiment.

A ball holder 2 having an almost M-shaped cross section shown in FIGS. 1 to 3 is mounted over the both opposite walls 11 of the bed member 1 through a number of balls 5 of the rolling guide unit so as to be slidable in the longitudinal direction in the following manner.

As particularly shown in FIG. 3, the ball holder has an almost M-shaped cross section and has a pair of opposite outside walls 21 extending in the axial direction and a pair of opposite inside walls 22 extending on the inside of the outside walls 21 so as to be formed in parallel therewith. Side grooves 24 having an inverse U-shaped cross section which open downwardly and extend in the axial direction are formed between the adjacent outside and inside opposite walls 21 and 22, respectively. The opposite walls 11 of the bed member 1 are inserted into the side grooves 24, respectively. On the other hand, flat plate-shaped coupling portions 23 to guide a belt are formed between both end portions in the axial direction of the inside opposite walls 22 of the holder 2, respectively, so as to construct a pair of coupling portions 23 in the axial direction. A pair of opposite circular holes 4 to pivotally support a pin are formed in almost the central portions in the axial direction of the inside opposite walls 22.

As mentioned above, the holder forms a pair of portions having an inverse U-shaped cross section by both of the outside walls 21 and the inside walls 22. A number of ball holding holes 25 to arrange and hold a number of balls at regular intervals are formed in each of the outside walls 21. The central portion of the holder 2 which is defined by the flat plate-shaped coupling portions 23 to integrally couple the pair of inverse U-shaped portions forms a space to insert and enclose a pin 6.

Since the holder 2 is of the ball holding type, it can be also similarly embodied by a construction in which the two right and left outside inverse U-shaped portions of the holder are separately formed as necessary and they are integrally coupled by one pin.

A table member 3 which is long in the axial direction and has an inverse U-shaped cross section is mounted so as to be slidable in the axial direction over the ball holder having an almost M-shaped cross section which is inserted and mounted over the bed member 1 as shown in FIG. 1. Horizontal track grooves 32 to roll the balls are formed at a proper height position on the opposite inner surfaces of a pair of opposite side walls 31 of the table member 3. The bed member 1 and the table member 3 are assembled through the holder 2 in a manner such that their bottom portions face each other and the table member 3 rides over and encloses the bed member 1 in a cavity portion 30 having a U-shaped cross section. A number of ball holding holes 25 are horizontally arranged in a line at regular intervals in the both opposite outside walls 21 of the holder 2 which is sandwiched between the bed member 1 and the table member 3. The bed member 1 and the table member 3 are assembled in a state in which the balls 5 are held in the holding holes 25 in a manner such that the balls 5 held by the holder 2 are rotatably sandwiched between the outside horizontal track groove 12 in the axial direction of the bed member 1 and the inside horizontal track groove 32 in the axial direction of the table member 3.

FIG. 2 is a side elevational view of the first embodiment of FIG. 1. The pin 6 is inserted and fixed with a pressure into the circular holes 4 formed in the central portions in the longitudinal direction of the holder 2. An inside belt 7 and an outside belt 8 are reeved to the pin 6 so as to wind the pin 6 from both edge surfaces in the axial direction of the holder 2. The edge surface portions of the belts 7 and 8 are fixed to fixing members attached to the edge portions of a table or a bed.

In the first embodiment of the invention, the inside belt 7 is of a single type and is wrapped to the central portion of the pin 6 by an almost half rotation (about an angle of 180°). The outside belt 8 is of the double-single type and is wrapped to the pin 6 by an almost half rotation (about an angle of 180°) in the direction opposite to the inside belt so as to be adjacent to both outer edges of the inside belt 7 wound around the central portion of the pin 6. The inside belt 7 and the outside belt 8 are extended horizontally in the opposite directions along the both of the upper and lower surfaces of the flat plate-shaped coupling portions 23, respectively. The upper sides of both free ends of the inside belt 7 and outside belt 8 are coupled to table side belt coupling portions 33 provided in both edge portions of the table member 3. The lower sides of both free ends, on the other hand, are coupled and fixed to bed side belt coupling portions 13 provided in both end portions of the bed member 1. By constructing as mentioned above, when the table member 3 and the bed member 1 relatively move, the inside and outside belts 7 and 8 frictionally slide and move on a partial circumferential surface of the pin 6, thereby restricting a movement amount of the holder 2 to ½ of a movement amount of the table. It is also possible to construct in a manner such that pulleys are attached to the pin to reduce the frictional resistance and the belts are wound around the pulleys.

Figure 4:
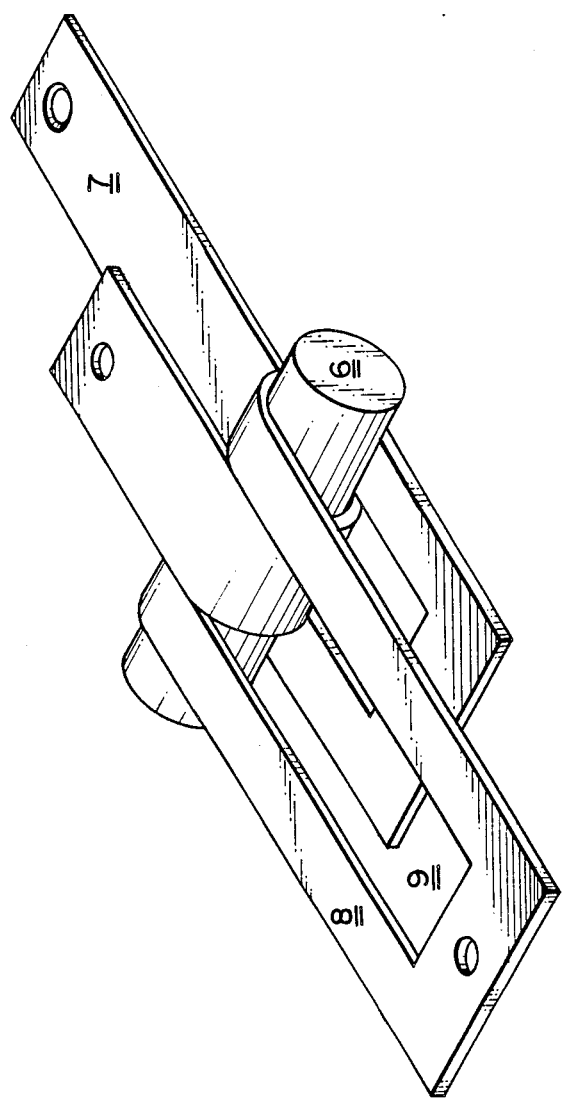
FIG. 4 is a perspective view showing the relation between the pin and the belt in the first embodiment.

FIG. 4 is a perspective view showing the relation of the combination of the pin 6 and the inside and outside belts 7 and 8 in the first embodiment. The outside belt 8 has a double-single shape as mentioned above. The inside belt 7 is inserted into a rectangular slit 9 which is formed between the two parallel belt portions of the outside belt 8. A contact area of the inside belt 7 to the pin 6 is equal to that of the outside belt 8.

In general, as materials of the belts and pin, steel is used in a manner similar to materials of the table and bed. However, the belts and pin can be also formed with a synthetic resin in dependence on the use conditions. Further, it is also possible to increase the frictional force by forming concave and convex portions onto the contact surface portions of the belts and pin. In the embodiment of FIG. 4, the pin 6 and the belts 7 and 8 are easily abraded because a slide friction occurs thereamong. Therefore, it is also possible to attach rolling guide units to the portions of the pin corresponding to the belts as necessary and thereby to provide a rolling contact state between the pin and the belts. (Such a construction is also common to an embodiment of FIG. 5.)

Figure 5:
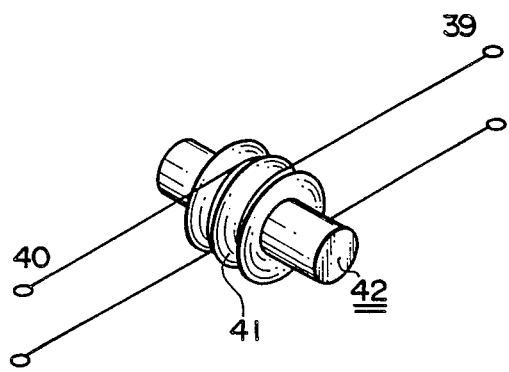
FIG. 5 is a perspective view showing a mechanism to prevent a positional deviation of a holder which is used in the second embodiment of the invention.

FIG. 5 shows a perspective view of the second embodiment of the invention. In the second embodiment, two wire ropes 39 and 40 are used and are extended in parallel in place of the inside and outside belts 7 and 8 in the first embodiment and a double track pulley (V pulley) 41 is used in place of the pin 6. Slips between the pulley and the ropes are reduced by winding the ropes 39 and 40 around the V pulley 41 a plurality of times as necessary.

As compared with the first embodiment, the second embodiment has a feature such that the rolling guide unit can be more cheaply manufactured although the deviation preventing accuracy deteriorates. Further, since the ropes are used, the dimension in the width direction can be set to a small value and the rolling guide unit can be further miniaturised.

According to the invention, there is provided a thin linear motion rolling guide unit having an apparatus for preventing a deviation of a running holder in which a pin or a pulley is provided in the central portion of a holder, ropes or belts are wound to the pin or pulley, one end of each of the ropes or belts is fixed to a table, and the other end is fixed to a bed.

The invention can be also applied to a unit of the type in which rollers are inserted by a cross roller method without limiting the rolling members to the balls.

Although the linear motion rolling guide unit of a finite stroke has been shown as an example in the diagrams, the invention can be also applied to a linear motion rolling guide unit of an infinite stroke having an endless circulating passageway.

According to the invention with the above construction, the following advantages are obtained.

(1) A positional deviation of the holder can be certainly prevented by a simple construction.
(2) The rolling guide unit can be cheaply manufactured.
(3) It is sufficient to use a shaft to move the ropes or belts and the number of parts is small.
(4) Since a positional deviation of the holder is prevented by reeving the belts or ropes so as to mutually stretch one shaft in the opposite directions, accumulation errors due to the assembly of the parts are small.

The present invention is not limited to the foregoing embodiments but many modifications and variations are possible within the spirit and scope of the appended claims of the invention.

What is claimed is:

1. A thin finite linear motion rolling guide unit having an apparatus for preventing a positional deviation of a holder, comprising:

a long bed member (1) having a U-shaped cross section in which outside horizontal track grooves (12) for rolling are formed on outer surfaces of both of opposite side walls;

a long table member (3) having an inverse U-shaped cross section in which inside horizontal track grooves (32) for rolling are formed on inner surfaces of both of opposite side walls at positions which face said horizontal track grooves (12) on the bed member side and opposite side walls (11) of the bed member (1) are enclosed in a cavity portion (30) having a U-shaped cross section, said table member (3) being mounted over the bed member (1) so as to be slidable in its longitudinal direction; and a holder (2) having a generally M-shaped cross section which is interposed between the bed member (1) and the table member (3) and is constructed in a manner such that a number of holding holes (25) are formed horizontally in a line at regular intervals in a pair of outside opposite walls (21) rotatably holding a number of rolling elements between the outside horizontal track groove (12) on the bed member side and the inside horizontal track groove (32) on the table member side, circular holes (4) are formed in generally central portions in its longitudinal direction of a pair of inside opposite walls (22) of the holder (2), a pin (6) is inserted and fixed with a pressure into said holes (4) in the direction perpendicular to the longitudinal direction, flat plate-shaped coupling portions (23) are formed symmetrically in both end portions in the longitudinal direction of the opposite inside walls (22), respectively, a single type inside belt (7) is wrapped to a central portion of the pin (6) by an almost half rotation, a double-single type outside belt (8) is wrapped to the pin (6) by an almost half rotation in the direction opposite to the inside belt (7) so as to come into contact with both of outer edges of the inside belt (7), said inside belt (7) and said outside belt (8) are extended horizontally in the opposite directions along both of upper and lower surfaces of the flat plate-shaped coupling portions (23), respectively, upper sides of both free ends of each of the inside belt (7) and the outside belt (8) are coupled to belt coupling portions (33) on the table member side provided in both end portions of the table member (3), and lower sides of said both free ends are coupled and fixed to belt coupling portions (13) on the bed member side provided in both end portions of the bed member (1).

2. A thin finite linear motion rolling guide unit having an apparatus for preventing a positional deviation of a holder, comprising:

a long bed member (1) having a U-shaped cross section in which outside horizontal track grooves (12) for rolling are formed on outer surfaces of both of opposite side walls;

a long table member (3) having an inverse U-shaped cross section in which inside horizontal track grooves (32) for rolling are formed on inner surfaces of both of opposite side walls at positions which face said horizontal track grooves (12) on the bed member side and opposite side walls (11) of the bed member (1) are enclosed in a cavity portion (30) having a U-shaped cross section, said table member (3) being mounted over the bed member (1) so as to be slidable in its longitudinal direction; and a holder (2) having a generally M-shaped cross section which is interposed between the bed member (1) and the table member (3) and is constructed in a manner such that a number of holding holes (25) are formed horizontally in a line at regular intervals in a pair of outside opposite walls (21) rotatably holding a number of rolling elements between the outside horizontal track groove (12) on the bed member side and the inside horizontal track groove (32) on the table member side, circular holes (4) are formed in generally central portions in its longitudinal direction of a pair of inside opposite walls (22) of the holder (2), a rotary shaft (42) of a pulley (41) with a double V-shaped guide grooves is inserted and fixed into the circular holes (4) with a pressure, flat plate-shaped coupling portions (23) are formed symmetrically in both end portions in the longitudinal direction of the opposite inside walls (22), respectively, a first wire rope (39) is wrapped to one of the V-shaped grooves of said pulley (41) by an almost half rotation, a second wire rope (40) is wrapped to the other V-shaped groove adjacent to said V-shaped groove of the pulley (41) by an almost half rotation in the direction opposite to said first wire rope (39), said first wire rope (39) and said second wire rope (40) are extended horizontally in the opposite directions along both upper and lower surfaces of the flat plate-shaped coupling portions (23), respectively, upper sides of both free ends of each of the first wire rope (39) and the second wire rope (40) are coupled to wire rope coupling portions (33) on the table member side provided in both end portions of the table member (3), and lower sides of said both free ends are coupled and fixed to belt coupling portions (13) provided in both end portions of the bed member (1).

3. A linear motion rolling guide unit comprising:

a U-shaped bed and an inverted U-shaped table positioned so that each wall of said bed is adjacent a wall of said table;

plural rolling elements positioned between adjacent walls of said bed and said table for allowing said bed and said table to move linearly relative to each other;

an M-shaped holder for holding said plural rolling elements between adjacent walls of said bed and said table;

said holder comprising a pin for affecting movement of said holder relative to said bed and said table carried in a central portion of said holder and having a longitudinal axis generally perpendicular to the direction of said linear relative motion; and two aligning means for aligning said holder between said bed and said table when said bed and table to move relative each other, each said aligning means making a half turn about said pin and having an end attached to said table and another end attached to said bed.

* * * * *